(12) United States Patent
Lee et al.

(10) Patent No.: US 9,148,939 B2
(45) Date of Patent: Sep. 29, 2015

(54) APPARATUS FOR REMOVING STATIC ELECTRICITY OF FUEL CELL STACK MANUFACTURING DEVICE

(71) Applicant: Hyundai Motor Company, Seoul (KR)

(72) Inventors: Nam Gu Lee, Yongin-si (KR); Sang Hyun Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/102,240

(22) Filed: Dec. 10, 2013

(65) Prior Publication Data

US 2015/0062771 A1    Mar. 5, 2015

(30) Foreign Application Priority Data

Sep. 2, 2013  (KR) ........................ 10-2013-0104855

(51) Int. Cl.
  *H05F 3/00*  (2006.01)
  *H05F 3/04*  (2006.01)
  *H05F 3/06*  (2006.01)
(52) U.S. Cl.
  CPC ...................................... *H05F 3/06* (2013.01)

(58) Field of Classification Search
  USPC .......................................................... 361/213
  See application file for complete search history.

(56) References Cited

U.S. PATENT DOCUMENTS

2006/0234095 A1 * 10/2006 Kong et al. .................... 429/26

FOREIGN PATENT DOCUMENTS

| JP | 2008-257891 A | 10/2008 |
| JP | 2012-009170 A | 1/2012 |
| JP | 2013-008664 A | 1/2013 |
| KR | 10-2004-0074007 A | 8/2004 |
| KR | 10-2005-0014658 A | 2/2005 |

* cited by examiner

*Primary Examiner* — Dharti Patel
(74) *Attorney, Agent, or Firm* — McDermott Will & Emery LLP

(57) ABSTRACT

An apparatus for removing static electricity of a fuel cell stack manufacturing device, includes a cartridge in which a plurality of Membrane Electrode Assemblies (MEAs) are received, an air nozzle portion disposed in an upper portion of the cartridge and including an air flow channel for air movement, a plurality of nozzle holes defined along an inner side of the air nozzle portion, which faces the MEAs disposed in the cartridge, to communicate with the air flow channel, and an air inlet portion configured to be supplied with ionized air from the outside to deliver the ionized air to the air flow channel of the air nozzle portion.

7 Claims, 4 Drawing Sheets

APPARATUS FOR REMOVING STATIC ELECTRICITY OF FUEL CELL STACK MANUFACTURING DEVICE

CROSS-REFERENCE TO RELATED APPLICATION

This application is based on and claims benefit of priority to Korean Patent Application No. 10-2013-0104855 filed on Sep. 2, 2013, the entire contents of which are incorporated herein by reference.

TECHNICAL FIELD

The present disclosure relates to an apparatus for removing static electricity of a fuel cell stack manufacturing device, and more particularly, to an apparatus for removing static electricity of a fuel cell stack manufacturing device to optimize cycle time and minimize a defect rate by effectively removing static electricity generated between a Membrane Electrode Assembly (MEA) and an interleaf in manufacturing of a fuel cell stack.

BACKGROUND

Generally, when a fuel cell stack is manufactured, several tens of sheets of Membrane Electrode Assemblies (MEAs) are stacked and transferred and thus, when a material is supplied, several sheets of MEAs are stacked and transferred. In this case, both sides of an MEA are formed of different catalysts and thus due to surface contact between MEAs, property change may occur. Therefore, an interleaf may be inserted between MEAs for protection during manufacturing processes of a multi-layer MEA product.

The interleaf is usually an intermediate paper made of Polyethylene (PE) and produces static electricity with a sub gasket portion of an MEA, such that in MEA transfer, two or three sheets of materials are transferred at a time, causing some problem in performing a subsequent process. Therefore, in the worst scenario, material damage may occur.

That is, to manufacture a finished multi-layer MEA product, the interleaf may be removed and then only an MEA may be transferred and used. Due to static electricity between the MEA and the interleaf, if the MEA and the interleaf are transferred at the same time, it would cause a problem in a manufacturing process for the finished product.

In other words, when an MEA, which is a main component, is transferred in fuel cell stack manufacturing, due to static electricity between the interleaf inserted between every two MEAs stacked in multiple layers and MEAs, a subsequent process is degraded, increasing a malfunction rate and a defect rate of devices.

To solve the problems, conventionally, in addition to a finished multi-layer MEA product manufacturing device, a static electricity removing apparatus for electric-charging material is installed in a predetermined position to blow ionized air to MEAs stacked in an MEA cartridge (a means for supplying MEAs to the manufacturing device), thus removing static electricity between the MEAs and the interleaf to reduce a malfunction rate and a defect rate of the finished multi-layer MEA assemble device.

The MEA cartridge merely stacks and receives several tens of sheets of MEAs and sequentially supplies them.

The conventional static electricity removing apparatus is configured separately from the manufacturing device, such that a distance from the static electricity removing apparatus to the MEA is relatively large and thus the ionized air arrives at the MEA after moving a predetermined distance from the static electricity removing apparatus As a result, it would be difficult to obtain a static electricity removing effect at a desired level.

SUMMARY

Accordingly, various aspects of the present inventive concept provide an apparatus for removing static electricity for a fuel cell stack manufacturing device, in which an air nozzle portion for supplying ionized air is installed integrally in a cartridge for receiving an MEA and the ionized air is directly supplied between the MEA received in the cartridge and the interleaf, thereby neutralizing static electricity between the MEA and the interleaf to maximize a static electricity removing effect.

One aspect of the present inventive concept relates to an apparatus for removing static electricity for a fuel cell stack manufacturing device. The apparatus includes a cartridge in which a plurality of Membrane Electrode Assemblies (MEAs) are disposed, an air nozzle portion disposed in an upper portion of the cartridge and including an air flow channel for air movement, a plurality of nozzle holes defined along an inner side of the air nozzle portion, which faces the MEAs disposed in the cartridge, to communicate with the air flow channel, and an air inlet portion configured to be supplied with ionized air from the outside to deliver the ionized air to the air flow channel of the air nozzle portion.

The apparatus may further include a blower configured to supply air of a predetermined pressure to the air inlet portion, and an ion emitter disposed between the blower and the air inlet portion and configured to emit cations and anions to air that moves from the blower to the air inlet portion is installed.

The air nozzle portion may enclose a circumference of an upper or uppermost MEA among the MEAs disposed in the cartridge, and the air inlet portion may include an inlet flow channel which communicates with the air flow channel of the air nozzle portion.

The cartridge may include an elevating portion in which several sheets of MEAs are stacked vertically and a support laterally supporting the MEAs stacked in the elevating portion, and the elevating portion may include a fixed plate and a moving plate which is movable up and down with respect to the fixed plate.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, the present inventive concept will be described in detail with reference to the accompanying drawings to allow those of ordinary skill in the art to easily carry out the present inventive concept.

The present inventive concept relates to an apparatus for removing static electricity between several sheets of Membrane Electrode Assemblies (MEAs) stacked vertically and an interleaf inserted therebetween in supply and transfer of the MEAs during manufacturing of a fuel cell stack. The static electricity removing apparatus may directly supply ionized air for static electricity removal supplied between the MEA and the interleaf to effectively remove static electricity and thus to improve the effect of reducing electrification between the MEA and the interleaf.

Figure 1:
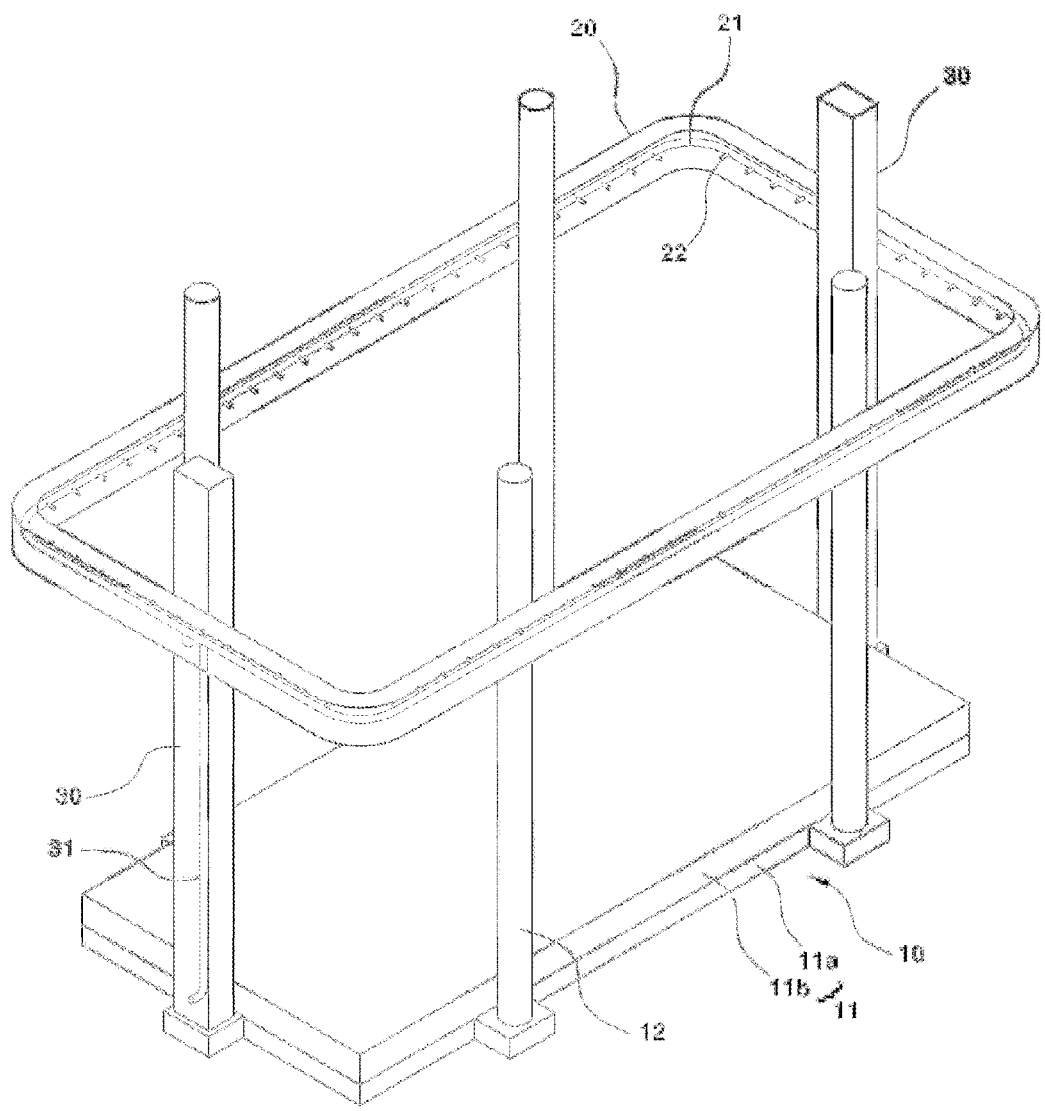
FIG. 1 is a structural diagram showing an apparatus for removing static electricity for a fuel cell stack manufacturing device according to an exemplary embodiment of the present inventive concept.

Referring to FIG. 1, an apparatus for removing static electricity (or a static electricity removing apparatus) according to the present inventive concept may include a cartridge 10 for receiving multiple MEAs and an air nozzle portion 20 installed on an upper portion of the cartridge 10.

The cartridge 10 may include an elevating portion 11 in which several sheets of MEAs may be stacked vertically, and a support 12 for laterally supporting the stacked MEAs on the elevating portion 11.

The elevating portion 11 may include a fixed plate 11a provided in a place where the cartridge 10 is installed and a moving plate 11b that is movable up and down with respect to the fixed plate 11a. The support 12 may be spaced by a predetermined distance along the circumference of the elevating portion 11 to enclose the MEAs on the elevating portion 11.

The air nozzle portion 20 may be attached at a predetermined height of the support 12 and may be supported to be positioned above the elevating portion 11. The air nozzle portion 20 may have an air flow channel 21 in which air is movable.

In an inner side of the air nozzle portion 20, which faces the MEAs received in the cartridge 10, multiple injection holes 22 communicating with the air flow channel 21 may be formed at predetermined intervals.

The air nozzle portion 20 may be provided to enclose the circumference of the upper or uppermost MEA among the MEAs received in the cartridge 10.

Since the air nozzle portion 20 may be provided to enclose the circumference of the uppermost MEA and the elevating portion 11, the injection holes 22 formed in the inner side of the air nozzle portion 20 may enclose and face the side (or circumference) of the upper or uppermost MEA among the MEAs stacked on the elevating portion 11 of the cartridge 10, and may inject ionized air to be supplied through the air flow channel 21 between the upper or uppermost MEA and the interleaf.

The ionized air supplied through the air flow channel 21 may be delivered from an air inlet portion 30.

The air inlet portion 30 may be supplied with the ionized air from the outside and deliver the ionized air to the air flow channel 21 of the air nozzle portion 20. To this end, the air inlet portion 30 may include an inlet flow channel 31 communicating with the air flow channel 21.

The inlet flow channel 31 may be configured to prevent the ionized air of a predetermined pressure from the outside from being directly introduced to the air flow channel 21 of the air nozzle portion 20. For example, the inlet flow channel 31 may be provided such that air is movable in an inner side of one or two or more supports selected from among the supports 12 of the cartridge 10. That is, the ionized air may be introduced from the outside to the air flow channel 21 through the supported parts.

Figure 2:
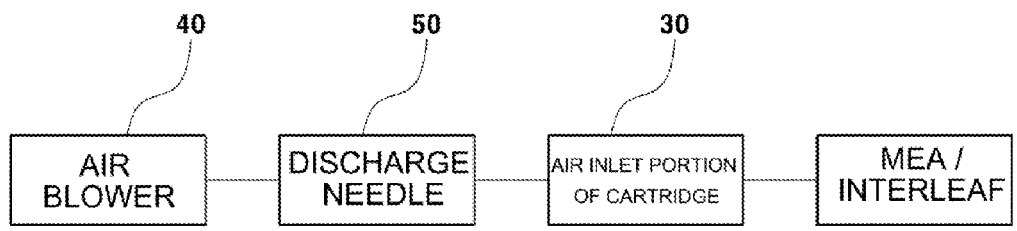
FIG. 2 is a diagram schematically showing a process of moving ionized air in an apparatus for removing static electricity according to an embodiment of the present inventive concept.

Referring to FIG. 2, the air inlet portion 30 may be supplied with air of a predetermined pressure from an external blower 40.

An ion emitter 50, e.g., a discharge needle, for emitting cations and anions when being applied with electricity may be installed between the blower 40 and the air inlet portion 30. Thus, when the blower 40 operates to supply the air of a predetermined pressure, the air moving from the blower 40 to the air inlet portion 30 may contain the cations and anions, such that the ionized air is produced and the produced ionized air is supplied to the air inlet portion 30.

That is, the air supplied from the blower 40 may contain the cations and anions while passing through the ion emitter 50, and may be in an ionized state when supplied to the air inlet portion 30.

The ion emitter 50 may be, for example, a discharge needle.

Herein, the blower 40 may be of a fan type which operates when input power is supplied thereto, and may supply air at a pressure of 5-10 bar.

When the air pressure exceeds 10 bar, the MEAs received in the cartridge 10 may be shaken, causing an alignment failure. In contrast, when the air pressure is less than 5 bar, the effect of removing static electricity between the MEA and the interleaf may be degraded.

The ionized air may be equally injected between the MEA, which is an electrification object, and the interleaf, such that static electricity is removed therebetween.

The static electricity removing apparatus configured as described above operates as described below.

Figure 3:
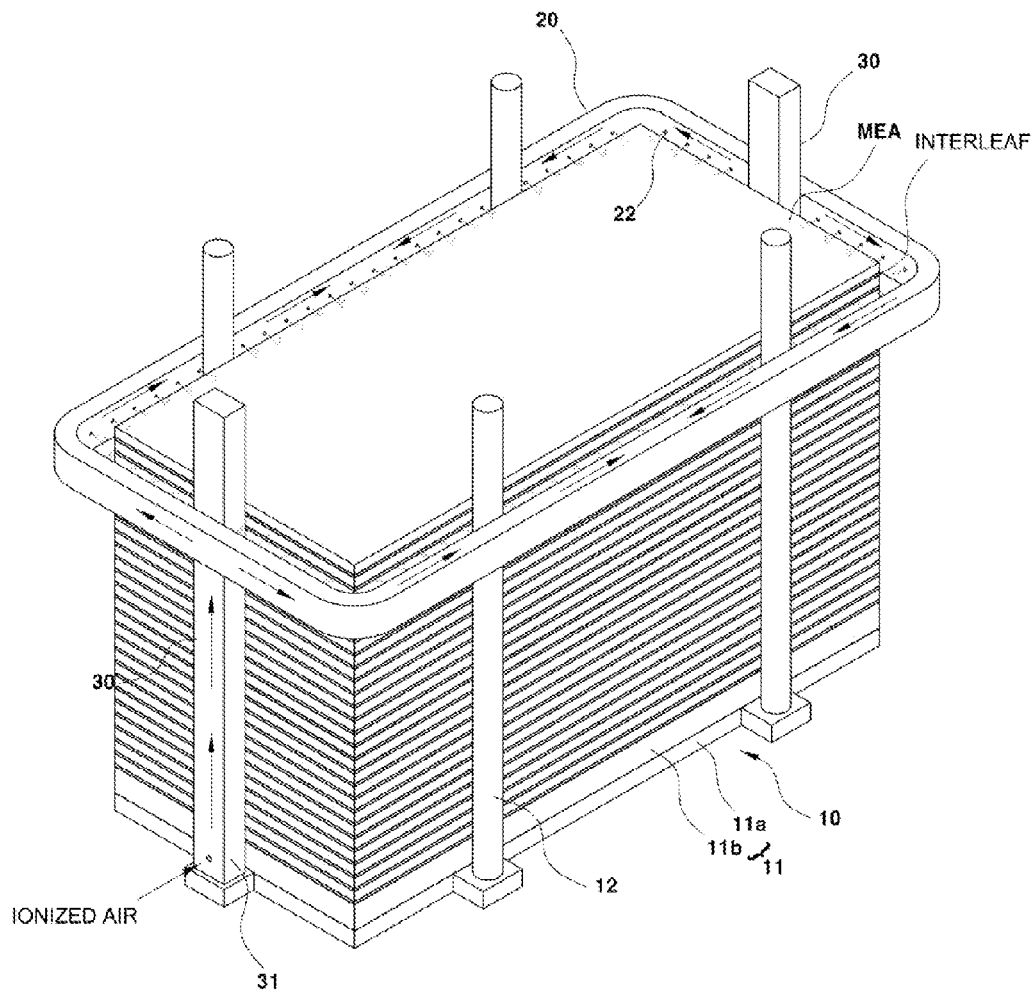
FIGS. 3 and 4 are diagrams showing an operating state of an apparatus for removing static electricity according to an exemplary embodiment of the present inventive concept.
Figure 4:
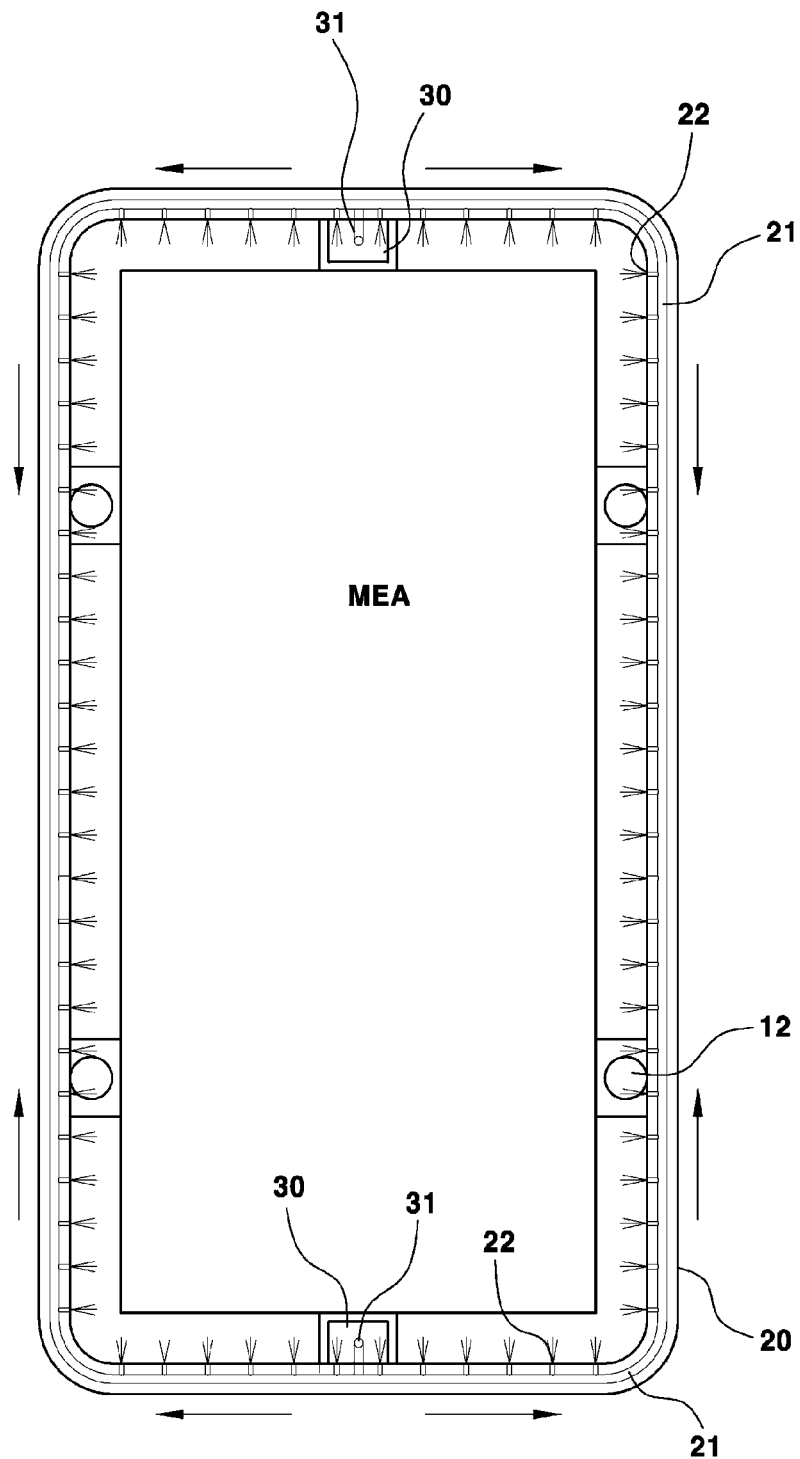

Referring to FIGS. 2 to 4, the air supplied at a predetermined pressure from the blower 40 may be ionized after passing through the ion emitter 50 (see FIG. 2) and injected between the MEA and the interleaf after passing through the flow channel 31 of the air inlet portion 30 and the flow channel 21 of the air nozzle portion 20.

In this state, the blower 40 may be driven to supply the air of a predetermined pressure and at the same time, electricity may be applied to the ion emitter 50 to emit ions.

Then, the air moving from the blower 40 to the air inlet portion 30 may be ionized by containing cations and anions while passing through the ion emitter 50, and the ionized air may be delivered to the air flow channel 21 of the air nozzle portion 20 through the inlet flow channel 31 of the air inlet portion 30.

In this state, the ionized air may sequentially move in the flow channels 31 and 21 due to the pressure of the blower 40, and then may be injected through the injection holes 20 at an equal pressure to be uniformly supplied between the MEA and the interleaf. The injected ionized air neutralizes and thus removes static electricity between the MEA and the interleaf.

As is apparent from the foregoing description, the static electricity removing apparatus for the fuel cell stack manufacturing device may directly supply ionized air between the MEA and the interleaf in the cartridge, thereby minimizing a time required for the ionized air to arrive between the MEA and the interleaf and thus effectively neutralizing and removing static electricity between the MEA and the interleaf. Such improvement of the anti-electrification effect prevents malfunction of the finished multi-layer MEA product manufacturing device and thus minimizes a defect rate. By optimizing a cycle time, a device utilization rate is improved and thus direct application to a mass production process is possible.

Moreover, by supporting a static electricity removing function in the cartridge, the size of the static electricity removing apparatus becomes compact.

The present inventive concept has been described in detail with reference to exemplary embodiments thereof. However, it will be appreciated by those skilled in the art that changes may be made in these embodiments without departing from the principles and spirit of the present inventive concept, the scope of which is defined in the appended claims and their equivalents.

DESCRIPTION OF REFERENCE NUMERALS

| 10: Cartridge | 11: Elevating Portion |
| 12: Support | 20: Air Nozzle Portion |
| 21: Air Flow Channel | 22: Injection Hole |
| 30: Air Inlet Portion | 31: Inlet Flow Channel |
| 40: Blower | 50: Ion Emitter |

What is claimed is:

1. An apparatus for removing static electricity for a fuel cell stack manufacturing device, the apparatus comprising:
    a cartridge in which a plurality of Membrane Electrode Assemblies (MEAs) and an interleaf inserted between the MEAs are disposed, the cartridge delivering the MEAs to the fuel cell stack manufacturing device;
    an air nozzle portion disposed in an upper portion of the cartridge and comprising an air flow channel for air movement;
    a plurality of nozzle holes defined along an inner side of the air nozzle portion, which faces the MEAs disposed in the cartridge, to communicate with the air flow channel; and
    an air inlet portion configured to be supplied with ionized air from the outside to deliver the ionized air to the air flow channel of the air nozzle portion.

2. The apparatus of claim 1, further comprising:
    a blower configured to supply air of a predetermined pressure to the air inlet portion; and
    an ion emitter disposed between the blower and the air inlet portion and configured to emit cations and anions to air that moves from the blower to the air inlet portion.

3. The apparatus of claim 1, wherein the air inlet portion comprises an inlet flow channel which communicates with the air flow channel of the air nozzle portion.

4. The apparatus of claim 2, wherein the blower supplies air at a pressure of 5-10 bar.

5. The apparatus of claim 1, wherein the air nozzle portion encloses a circumference of an upper or uppermost MEA among the MEAs disposed in the cartridge.

6. The apparatus of claim 1, wherein:
    the cartridge comprises an elevating portion in which several sheets of MEAs are stacked vertically and a support laterally supporting the MEAs stacked in the elevating portion, and
    the elevating portion comprises a fixed plate and a moving plate which is movable up and down with respect to the fixed plate.

7. An apparatus for removing static electricity for a fuel cell stack manufacturing device, the apparatus comprising:
    a cartridge in which a plurality of Membrane Electrode Assemblies (MEAs) are disposed;
    an air nozzle portion disposed in an upper portion of the cartridge and comprising an air flow channel for air movement;
    a plurality of nozzle holes defined along an inner side of the air nozzle portion, which faces the MEAs disposed in the cartridge, to communicate with the air flow channel;
    an air inlet portion configured to be supplied with ionized air from the outside to deliver the ionized air to the air flow channel of the air nozzle portion; and
    a blower configured to supply air of a predetermined pressure to the air inlet portion; and
    an ion emitter disposed between the blower and the air inlet portion and configured to emit cations and anions to air that moves from the blower to the air inlet portion.

\* \* \* \* \*